US012799968B2

(12) United States Patent
Deng et al.

(10) Patent No.: US 12,799,968 B2
(45) Date of Patent: Nov. 17, 2026

(54) CONNECTION STRUCTURE WITH AUTOMATIC ADJUSTABLE ECCENTRICITY

(71) Applicant: Jiantao Deng, Fujian (CN)

(72) Inventors: Jiantao Deng, Fujian (CN); Chenghe Deng, Fujian (CN)

(73) Assignee: Jiantao Deng, Fujian (CN)

( * ) Notice: Subject to any disclaimer, the term of this patent is extended or adjusted under 35 U.S.C. 154(b) by 239 days.

(21) Appl. No.: 18/689,512

(22) PCT Filed: Aug. 23, 2022

(86) PCT No.: PCT/CN2022/114232
§ 371 (c)(1),
(2) Date: Mar. 6, 2024

(87) PCT Pub. No.: WO2023/035934
PCT Pub. Date: Mar. 16, 2023

(65) Prior Publication Data

US 2024/0376919 A1 Nov. 14, 2024

(30) Foreign Application Priority Data

Sep. 10, 2021 (CN) ........................ 202122186631.5

(51) Int. Cl.
*F16B 21/07* (2006.01)
*F16B 7/04* (2006.01)
*F16B 7/18* (2006.01)

(52) U.S. Cl.
CPC .......... *F16B 21/073* (2013.01); *F16B 7/0413* (2013.01); *F16B 7/182* (2013.01); *Y10S 403/08* (2013.01); *Y10T 403/57* (2015.01)

(58) Field of Classification Search
CPC ....... E02D 5/526; E02D 2600/20; F16B 2/18; F16B 7/00; F16B 7/0406; F16B 7/0413;
(Continued)

(56) References Cited

U.S. PATENT DOCUMENTS 2,720,405 A * 10/1955 Kennedy ................ F16B 7/182
403/183
3,833,012 A * 9/1974 McAllister ............ F16B 7/1427
403/350
(Continued)

FOREIGN PATENT DOCUMENTS

CN 110107569 A * 8/2019 ................ F16B 7/00
CN 210068669 U * 2/2020 ................ F16B 7/08
(Continued)

*Primary Examiner* — Josh Skroupa
(74) *Attorney, Agent, or Firm* — Hawaii Patent Services; Nathaniel K. Fedde; Kenton N. Fedde

(57) ABSTRACT

A connection structure with automatic adjustable eccentricity, including a locking portion and a pin portion respectively arranged on two components. An adjusting portion is arranged between the locking portion and the pin portion. The locking portion includes a lock cylinder open toward the pin portion, a supporting sleeve arranged at an open end of the lock cylinder, a floating sleeve movably arranged on the supporting sleeve, and a latch mechanism arranged on the floating sleeve. The floating sleeve is movable along a radial direction of the lock cylinder. The pin portion includes a pin cylinder and a pin head. The pin cylinder is open toward the locking portion. The pin head includes a thread end connected with an open end of the pin cylinder and a pin end fixed on the thread end. An outer periphery of an upper part of the pin end is provided with an annular groove.

9 Claims, 11 Drawing Sheets

(58) Field of Classification Search
CPC .......... F16B 7/042; F16B 7/06; F16B 7/1427; F16B 7/18; F16B 7/182; F16B 19/02; F16B 21/02; F16B 21/065; F16B 21/07; F16B 21/073; F16B 21/16; F16B 21/186; F16B 2200/63; Y10S 403/08; Y10T 403/11; Y10T 403/29; Y10T 403/291; Y10T 403/293; Y10T 403/295; Y10T 403/297; Y10T 403/299; Y10T 403/57; Y10T 403/5706; Y10T 403/5741; Y10T 403/5786
USPC ...... 403/2, 43, 44, 45, 46, 47, 48, 300, 301, 403/306, 314, DIG. 8; 411/216, 217
See application file for complete search history.

(56) References Cited

U.S. PATENT DOCUMENTS

| | | | | | |
|---|---|---|---|---|---|
| 5,193,929 | A * | 3/1993 | Kahn | F16B 7/0413 403/14 |
| 9,416,805 | B2 * | 8/2016 | Cascolan | F16B 7/042 |
| 9,863,456 | B2 * | 1/2018 | Canuto | F16B 21/073 |
| 2023/0286734 | A1 * | 9/2023 | Benschop | F16B 7/042 |

FOREIGN PATENT DOCUMENTS

| | | | | | |
|---|---|---|---|---|---|
| CN | 105805111 | B | * | 3/2020 | F16B 7/182 |
| CN | 111637127 | A | * | 9/2020 | F16B 21/02 |
| CN | 212455135 | U | * | 2/2021 | F16B 21/02 |
| CN | 107795018 | B | * | 7/2023 | E04B 1/388 |

* cited by examiner

CONNECTION STRUCTURE WITH AUTOMATIC ADJUSTABLE ECCENTRICITY

FIELD OF TECHNOLOGY

The present utility model relates to a connection structure with automatic adjustable eccentricity, in the technical field of pin-lock connection structures.

BACKGROUND

In recent years, insertion structures have been widely used for the connection of components in a variety of fields. These structures do not need welding or a curing agent, and can automatically adapt to the eccentricity of connecting members, and is convenient to implement and suitable for connection of various assembled structures.

Chinese Utility Model No. CN212455135U, entitled "PIN-LOCK CONNECTION STRUCTURE CAPABLE OF ADJUSTING ECCENTRICITY", discloses a pin-lock connection structure with adjustable eccentricity, comprising a locking portion and a pin portion respectively arranged on two components and are not coaxial. An eccentric structure is further arranged between the locking portion and the pin portion. The locking portion includes a lock cylinder open toward the pin portion and a latch mechanism arranged in the lock cylinder. The other end of the lock cylinder is sleeved with a connecting member. The pin portion includes a pin cylinder open toward the locking portion. The other end of the pin cylinder is sleeved with another connecting member. The eccentric structure includes a vertical hollow sleeve and a pin in a shape of a stepped shaft with a small upper end and a large lower end. An outer periphery of the sleeve is coaxially sleeved in the lock cylinder. The large end of the pin is coaxially sleeved in the pin cylinder, and the small end of the pin can be inserted upward into the sleeve. The eccentric structure is adjusted until the axis of the small end of the pin coincides with the axis of the inner periphery of the sleeve, so that the small end of the pin can run upward through the sleeve so as to be inserted into the lock cylinder and locked with the latch mechanism. According to this pin-lock connection structure with adjustable eccentricity, with the eccentric structure arranged between the pin portion and the locking portion, the pin portion can be normally inserted into the locking portion by adjusting the eccentric structure even if the pin portion and the locking portion are not coaxial.

In the above utility model, the eccentric structure used facilitates the insertion to some extent. However, in actual use, since the pin head needs to be closely fitted with the eccentric sleeve in the lock cylinder, the gap between the outer periphery of the pin head and the eccentric hole of the eccentric sleeve cannot be overly large. Before the pin head is inserted into the eccentric hole, the eccentricity of the eccentric sleeve needs to be adjusted accurately. However, the locking portion and the pin portion are located at two different components, and there is not enough space between the two components for the operator to ascertain the fit between the pin head and the eccentric hole. In this case, only after the eccentric sleeve is repeatedly adjusted, can a good fit between the pin head and the eccentric hole be achieved. Therefore, this method is not convenient enough.

SUMMARY

In order to overcome the above problems, the present invention provides a connection structure with automatic adjustable eccentricity. The connection structure with automatic adjustable eccentricity adopts a floating sleeve, so that while a pin head is inserted into a lock cylinder, the floating sleeve moves along a radial direction of the lock cylinder under the guide action of the guide head, and as the pin head continuously goes deeper into the lock cylinder, deviation is automatically corrected and the pin head is locked with a latch mechanism, thereby achieving secured connection between a pin portion and a locking portion.

The technical solution of the present invention is as follows:

A connection structure with automatic adjustable eccentricity includes a locking portion and a pin portion respectively arranged on two components. An adjusting portion is arranged between the locking portion and the pin portion. The locking portion includes a lock cylinder open toward the pin portion, a supporting sleeve threadedly arranged at an open end of the lock cylinder, a floating sleeve movably arranged on the supporting sleeve, and a latch mechanism arranged on the floating sleeve. The floating sleeve is movable along a radial direction of the lock cylinder. The pin portion includes a pin cylinder and a pin head. The pin cylinder is open toward the locking portion. The pin head includes a thread end threadedly connected with an open end of the pin cylinder and a pin end fixed on the thread end. An outer periphery of an upper part of the pin end is provided with an annular groove. Once the pin end is extended upwardly out of the supporting sleeve and the floating sleeve, the annular groove is fitted and fixed with the latch mechanism. The adjusting portion is sleeved on the pin end and is arranged to control a depth of the pin head inserted into the lock cylinder. The other end of the lock cylinder and the other end of the pin cylinder are respectively provided with a connecting member.

Further, the latch mechanism includes a pressing frame and a locking member. An inner periphery of the locking member is sleeved on an outer periphery of the annular groove, and a lower part of the locking member is accommodated in an upper part of an inner periphery of the floating sleeve. The pressing frame includes a pressing ring, a supporting tube and a retaining ring. The pressing ring is arranged horizontally and sleeved above an outer side of the annular groove. The pressing ring presses against the locking member. The supporting tube is vertical and hollow and is fixed to an upper end of an inner side of the pressing ring, and the supporting tube is located on an outer periphery of the pin end. The retaining ring is vertical and hollow and is fixed to a lower end of an outer side of the pressing ring, and the retaining ring is located on an outer side of the locking member. The retaining ring is located above the floating sleeve.

Further, the locking member includes a rubber ring and a plurality of arc-shaped ring blocks. An inner periphery of the rubber ring is sleeved on the outer periphery of the annular groove, and a lower part of the rubber ring is accommodated in the upper part of the inner periphery of the floating sleeve. The rubber ring has a hollow ring structure. The plurality of arc-shaped ring blocks are arranged to form a complete ring structure. The ring structure formed by the arc-shaped ring blocks is accommodated inside the ring structure of the rubber ring.

Further, the pin end includes an insertion rod, the annular groove and a guide head. The insertion rod is fixed to an upper end of the thread end. The annular groove is annularly provided on an outer peripheral wall of a top end of the insertion rod. The guide head is fixed to an upper end of the annular groove. The guide head has a truncated cone-shaped structure with a small upper end and a large lower end.

Further, the connection structure with automatic adjustable eccentricity further includes an eccentric sleeve. An outer periphery of the eccentric sleeve is threadedly connected to an inner side of the open end of the pin cylinder. The thread end of the pin head is threadedly connected to an inner periphery of the eccentric sleeve. The thread end of the pin head and the pin cylinder are eccentrically arranged.

Further, the connection structure with automatic adjustable eccentricity further includes an elastic member. The elastic member is sleeved on an outer periphery of the supporting tube. An upper end of the elastic member is attached below an inner end surface of the lock cylinder, and a lower end of the elastic member is attached to an upper end of the pressing ring.

Further, the connection structure with automatic adjustable eccentricity further includes a gasket. The gasket is fixed below the inner end surface of the lock cylinder. The upper end of the elastic member is attached to a lower end of the gasket.

Further, the adjusting portion includes an adjusting nut and a pin key. A middle part of the adjusting nut is provided with a vertical and hollow through hole for the pin head to pass through. An inner side of the adjusting nut is provided with a vertical keyway communicating with the through hole. One side of the pin key is clamped and fixed in the keyway. An outer peripheral wall of the pin end is provided with a vertical slide way along an axial direction. An upper end of the slide way communicates with the annular groove. The through hole of the adjusting nut is sleeved outside the pin end. The other side of the pin key is slidable in the slide way.

Further, the elastic member is a flexible rubber tube.

The present utility model has the following beneficial effects:

1. The connection structure with automatic adjustable eccentricity adopts a floating sleeve, so that while the pin head is inserted into the lock cylinder, the floating sleeve moves along a radial direction of the lock cylinder under the guide action of the guide head, and as the pin head continuously goes deep into the lock cylinder, deviation is automatically corrected and the pin head is locked with the latch mechanism, thereby realizing fixation between the pin portion and the locking portion.
2. The floating sleeve is movable along the radial direction of the lock cylinder, and the fixed support is provided with a push receiving slot matched with the guide head of the pin head. Thus, when the pin head enters the lock cylinder, the guide head contacts the push receiving slot of the fixed support first, and through the fit between the truncated cone slopes of the guide head and the push receiving slot, the floating sleeve automatically guides the fixed support, thereby realizing automatic deviation correction and finally completing the insertion.
3. Since there is a certain space in the supporting sleeve for the pin end to move horizontally and the floating sleeve can also move along the radial direction of the lock cylinder, even after the pin portion is inserted into the locking portion, the pin portion can still move slightly along the radial direction of the locking portion, so that the insertion between other pin portions and locking portions on the two components can also be completed. After the insertion between all the pin portions and the locking portions is completed, the adjusting portions are finally tightened, thereby finally completing the assembly of the two components.

REFERENCE SIGNS IN THE FIGURES

Figure 1:
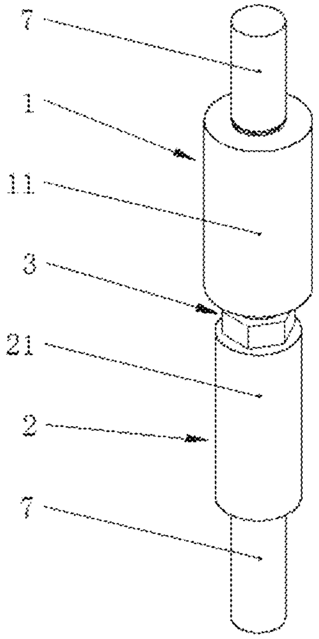
FIG. 1 is a schematic overall structural view of the present utility model.
Figure 2:
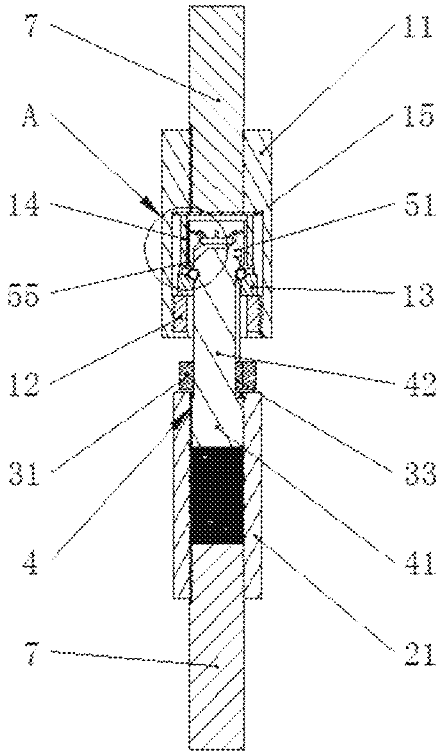
FIG. 2 is a cutaway view of FIG. 1.
Figure 3:
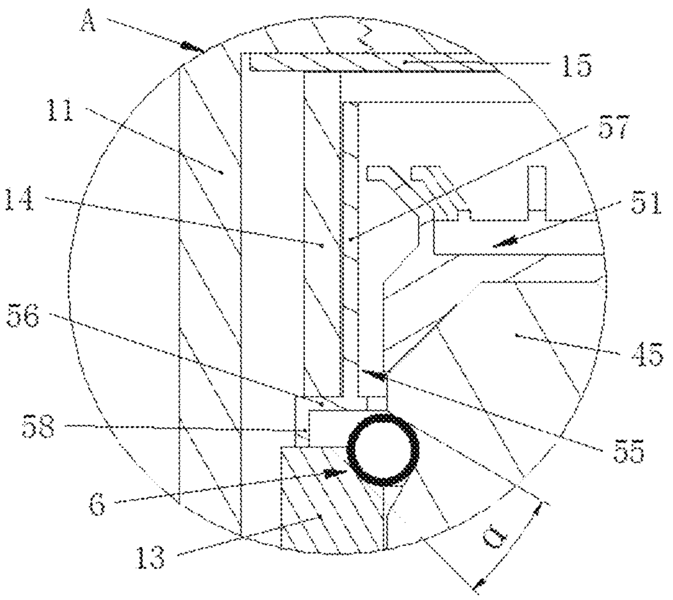
FIG. 3 is a partial enlarged view of A in FIG. 2.
Figure 4:
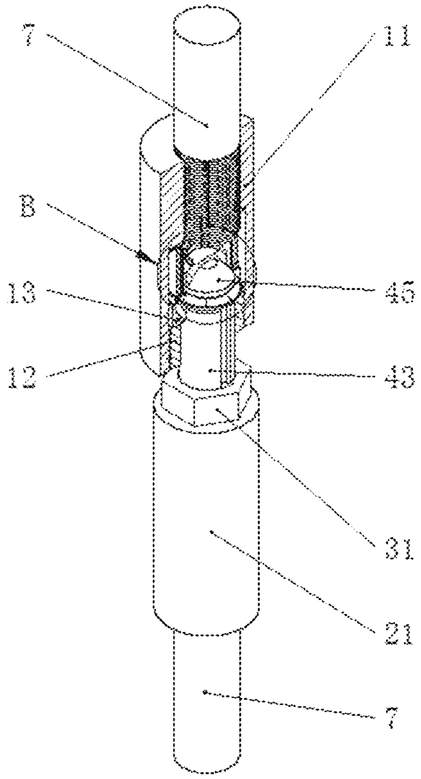
FIG. 4 is a schematic internal structural view of a locking portion of the present utility model.
Figure 5:
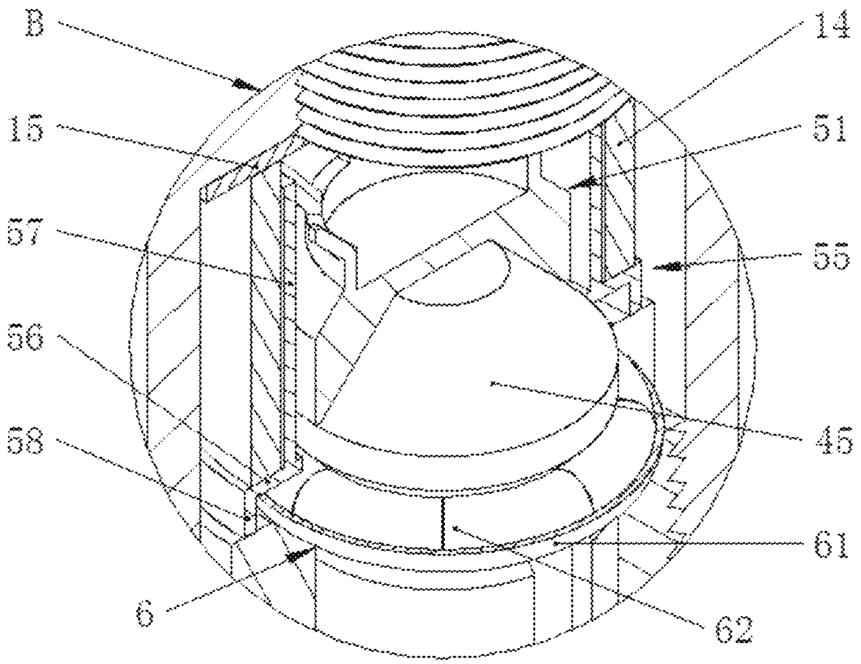
FIG. 5 is a partial enlarged view of B in FIG. 4.

1. locking portion; 11, lock cylinder; 12, supporting sleeve; 13, floating sleeve; 14, elastic member; 15, gasket; 16, chute; 17, clamping hole; 2, pin portion; 21, pin cylinder; 22, eccentric sleeve; 3, adjusting portion; 31, adjusting nut; 32, keyway; 33, pin key; 4, pin head; 41, thread end; 42, pin end; 43, insertion rod; 44, annular groove; 45, guide head; 46, slide way; 5, fixed support; 51, base; 52, push receiving slot; 53, annular groove; 54, rib; 55, pressing frame; 56, pressing ring; 57, supporting tube; 58, retaining ring; 59, protruding edge; 6, locking member; 61, rubber ring; 62, arc-shaped ring block; 7, connecting member.

DESCRIPTION OF THE EMBODIMENTS

The present utility model will be described in detail below in conjunction with accompanying drawings and specific embodiments.

Referring to FIG. 1 to FIG. 20, a connection structure with automatic adjustable eccentricity includes a locking portion 1 and a pin portion 2 respectively arranged on two components. An adjusting portion 3 is arranged between the locking portion 1 and the pin portion 2. The locking portion 1 includes a lock cylinder 11 open toward the pin portion 2, a supporting sleeve 12 threadedly arranged at an open end of the lock cylinder 11, a floating sleeve 13 movably arranged on the supporting sleeve 12, and a latch mechanism arranged on the floating sleeve 13. The floating sleeve 13 is movable along a radial direction of the lock cylinder 11. The pin portion 2 includes a pin cylinder 21 and a pin head 4. The pin cylinder 21 is open toward the locking portion 1. The pin head 4 includes a thread end 41 threadedly connected with an open end of the pin cylinder 21 and a pin end 42 fixed on the thread end 41. An outer periphery of an upper part of the pin end 42 is provided with an annular groove 44. Once the pin end 42 is extended upwardly out of the supporting sleeve 12 and the floating sleeve 13, the annular groove 44 is fitted and fixed with the latch mechanism. The adjusting portion 3 is sleeved on the pin end 42 and is arranged to control a depth of the pin head 4 inserted into the lock cylinder 11. The other end of the lock cylinder 11 and the other end of the pin cylinder 21 are respectively provided with a connecting member 7.

According to the above description, the connection structure with automatic adjustable eccentricity mainly includes the locking portion 1, the pin portion 2 and the adjusting portion 3. The locking portion 1 includes a lock cylinder 11, a supporting sleeve 12, a floating sleeve 13, a latch mechanism and a connecting member 7. An end of the lock cylinder 11 facing the pin portion 2 is open. The supporting sleeve 12 is threadedly arranged at the open end of the lock cylinder 11. The floating sleeve 13 is movably arranged on the supporting sleeve 12 and is movable along a radial direction of the lock cylinder 11. The latch mechanism is arranged on the floating sleeve 13, and is movable together with the floating sleeve 13 when the floating sleeve 13 moves. The pin portion 2 includes a pin cylinder 21, a pin head 4 and another connecting member 7. An end of the pin cylinder 21 facing the locking portion 1 is open. The pin head 4 includes a thread end 41, a pin end 42 and an annular groove 44. The thread end 41 is threadedly connected with the open end of the pin cylinder 21. The pin end 42 is fixed on the thread end 41 and can be inserted into the lock cylinder 11. The annular groove 44 is provided on an outer peripheral wall of the upper part of the pin end 42 and fitted with the latch mechanism, so that the pin end 42 can be locked in the lock cylinder 11. Once the pin end 42 is extended upwardly and sequentially out of the supporting sleeve 12 and the floating sleeve 13, the annular groove 44 can be fitted and fixed with the latch mechanism. The adjusting portion 3 is sleeved on the pin end 42 and is arranged to control a depth of the pin end 42 inserted into the lock cylinder 11. The connecting members 7 are configured to fix the locking portion 1 and the pin portion 2 to the components respectively.

Particularly, an outer diameter of the floating sleeve 13 is smaller than an inner diameter of the lock cylinder 11, so that the floating sleeve 13 is moveable along the radial direction of the lock cylinder 11 before the pin end 42 is locked by the locking mechanism. An outer diameter of the pin end 42 should be slightly smaller than an inner diameter of the floating sleeve 13, so that the pin end 42 can pass through the inner periphery of the floating sleeve 13.

Particularly, the connecting member 7 is a reinforced bar or a steel bar. Moreover, the connecting member 7 is fitted with the locking portion 1 or the pin portion 2 by means of a button head or a threaded connection.

Particularly, the thread end 41 and the pin end 42 are arranged coaxially.

Further, the latch mechanism includes a pressing frame 55 and a locking member 6. An inner periphery of the locking member 6 is sleeved on an outer periphery of the annular groove 44, and a lower part of the locking member 6 is accommodated in an upper part of an inner periphery of the floating sleeve 13. The pressing frame 55 includes a pressing ring 56, a supporting tube 57 and a retaining ring 58. The pressing ring 56 is arranged horizontally and sleeved above an outer side of the annular groove 44. The pressing ring 56 presses against the locking member 6. The supporting tube 57 is vertical and hollow and is fixed to an upper end of an inner side of the pressing ring 56, and the supporting tube 57 is located on an outer periphery of the pin end 42. The retaining ring 58 is vertical and hollow and is fixed to a lower end of an outer side of the pressing ring 56, and the retaining ring 58 is located on an outer side of the locking member 6. The retaining ring 58 is located above the floating sleeve 13.

According to the above description, the latch mechanism includes the pressing frame 55 and the locking member 6. The pressing frame 55 includes the pressing ring 56, the supporting tube 57 and the retaining ring 58. The pressing ring 56 is sleeved above the outer side of the annular groove 44 and presses against the locking member 6. The supporting tube 57 is fixed to the upper end of the inner side of the pressing ring 56, and the supporting tube 57 is located on the outer periphery of the upper part of the pin end 42. The retaining ring 58 is fixed to the lower end of the outer side of the pressing ring 56, and the retaining ring 58 is located outside the locking member 6 and above the floating sleeve 13. The locking member 6 is sleeved on the annular groove 44, so that the annular groove 44, the upper part of the inner periphery of the floating sleeve 13, the inner periphery of the retaining ring 58 and the lower end surface of the pressing ring 56 form an accommodating space for fixing the locking member 6. The pin end 42 is inserted into the lock cylinder 11, so that after the locking member 6 enters the annular groove 44, the pin end 42 is locked in the lock cylinder 11, thereby realizing fixation between the pin portion 2 and the locking portion 1.

Particularly, before the latch mechanism is installed, the major structure is the fixed support 5 and the locking member 6. The fixed support 5 sequentially includes a base 51 and the pressing frame 55 coaxially arranged from bottom to top. The base 51 is cylindrical, and is provided with a push receiving slot 52 at the lower end surface. The outer periphery of the upper end of the base 51 is annularly provided with an annular groove 53. A plurality of ribs 54 are uniformly fixed to the outer side of the upper end of the annular groove 53 at intervals along a circumferential direction, and the other end of each of the ribs 54 is fixed to the inner periphery of the pressing ring 56. The annular groove 53 of the fixed support 5 is a component for preliminarily fixing the locking member 6 during the installation of the locking portion 1. During installation, the outer periphery of the base 51 is sleeved on the inner periphery of the floating sleeve 13. When in use, once the pin end 42 of the pin head 4 has entered the lock cylinder 11 and the top of the pin end 42 abuts against the push receiving slot 52, the push receiving slot 52 is first fitted with the top of the pin end 42 to realize deviation correction, so that the floating sleeve 13, which could freely move along the radial direction of the lock cylinder 11, can be automatically aligned. Then, the push receiving slot 52 continues to be subjected to the pushing force of the pin end 42, and after the top of the supporting tube 57 of the pressing frame 55 abuts against the inner end surface of the lock cylinder 11, the base 51 moves up, and the ribs 54 are forced to break, so that the fixed support 5 is separated into the base 51 and the pressing frame 55. The pressing frame 55 functions to press and fix the locking member 6, and the base 51 is located in the supporting tube 57.

Particularly, the outer periphery of the base 51 is further uniformly provided with a plurality of protruding edges 59, so that during the installation of the fixed support 5, the base 51 can be clamped with the inner periphery of the floating sleeve 13 more conveniently.

Particularly, the strength of the ribs 54 is much lower than that of the base 51 and the pressing frame 55, so that the base 51 and the pressing frame 55 can be separated normally.

Particularly, the distance between the upper end of the supporting tube 57 and the inner end surface of the lock cylinder 11 should be slightly smaller than the maximum upward stroke of the locking member 6 pushed by the base 51. In this way, when the locking member 6 is pushed by the base 51 to lift the pressing frame 55, the supporting tube 57 is under pressure. After the ribs 54 of the fixed support 5 break, the base 51 is separated from the pressing frame 55, and the supporting tube 57 under pressure releases elastic force so as to press the locking member 6 downward into the annular groove 44 of the pin end 42 through the pressing ring 56.

Particularly, the inner diameter of the retaining ring 58 should be slightly smaller than the sum of the outer diameter of the base 51 and twice the cross-sectional length of the locking member 6. After the locking member 6 is pushed by the base 51 and the ribs 54 break, the base 51 is pushed into the supporting tube 57. While the base 51 is moving upward, the locking member 6 is temporarily sleeved outside the base 51, and at this time, the retaining ring 58 is under pressure. After the base 51 passes through the pressing ring 56 the locking member 6 is separated from the base 51, the retaining ring 58 under pressure releases elastic force so as to press the locking member 6 into the annular groove 44 of the pin end 42.

Particularly, the inner diameter of the locking member 6 is slightly smaller than the inner diameter of the bottom of the annular groove 44, so that the locking member 6 can be sleeved on the annular groove 44.

Particularly, the inner diameter of the pressing ring 56 and the inner diameter of the supporting tube 57 are respectively greater than the outer diameter of the pin end 42 and the outer diameter of the base 51, so that the pin end 42 and the base 51 can pass through normally.

Particularly, the upper part of the inner periphery of the floating sleeve 13 is obliquely provided with a chute 16, so that the locking member 6 can be better fixed.

Particularly, an included angle $\alpha$ between the chute 16 and the upper end of the annular groove 44 should be smaller than 180°, and a distance between the sides of the chute 16 and the annular groove 44 close to the axis of the pin end 42 should be greater than a distance between the sides of the chute and the annular groove away from the axis of the pin end 42. In this way, after the pin portion 2 and the locking portion 1 are locked, the chute 16 and the annular groove 44 can clamp the locking member 6 and prevent the locking member 6 from coming out of the annular groove 44. Preferably, $\alpha$ is 15°.

Particularly, the outer diameter of the pin end 42 is smaller than (even much smaller than) the inner diameter of the supporting sleeve 12, so that there is a certain space in the supporting sleeve 12 for the pin end 42 to move horizontally. In this way, when the pin portion 2 and the locking portion 1 on the two components are fitted, even if the pin head 4 of the pin portion 2 and the supporting sleeve 12 of the locking portion 1 are not coaxial, as long as the pin end 42 can normally enter the supporting sleeve 12 by adjustment, the deviation can be corrected through the guide fit between the top of the pin end 42 and the push receiving slot 52 of the fixed support 5, so that the floating sleeve 13, which could freely move along the radial direction of the lock cylinder 11, can be automatically aligned, and then the insertion between the pin portion 2 and the locking portion 1 can be completed. In addition, after the insertion of one set of the pin portion 2 and the locking portion 1 on the two components is completed, if the other pin portions 2 and locking portions 1 on the components cannot be assembled only because the pin heads 4 are not aligned with the supporting sleeves 12, then because there is a certain space in the supporting sleeve 12 for the pin end 42 to move horizontally and the floating sleeve 13 can also move along the radial direction of the lock cylinder 11, the pin portion 2 can still move slightly along the radial direction of the locking portion 1 after the pin portion 2 is inserted into the locking portion 1, so that the insertion between the other pin portions 2 and locking portions 1 on the components can be completed smoothly. After the insertion between all the pin portions 2 and the locking portions 1 is completed, the adjusting portions 3 are finally tightened, thereby finally completing the assembly.

Particularly, the difference between the outer diameter of the floating sleeve 13 and the inner diameter of the lock cylinder 11 should be slightly greater than the difference between the outer diameter of the pin end 42 and the inner diameter of the supporting sleeve 12.

Further, the locking member 6 includes a rubber ring 61 and a plurality of arc-shaped ring blocks 62. An inner periphery of the rubber ring 61 is sleeved on the outer periphery of the annular groove 44, and a lower part of the rubber ring 61 is accommodated in the upper part of the inner periphery of the floating sleeve 13. The rubber ring 61 has a hollow ring structure. The plurality of arc-shaped ring blocks 62 are arranged to forma complete ring structure. The ring structure formed by the arc-shaped ring blocks 62 is accommodated inside the ring structure of the rubber ring 61.

According to the above description, the locking member 6 includes the rubber ring 61 and the plurality of arc-shaped ring blocks 62. The rubber ring 61 is sleeved on the annular groove 44, and the rubber ring 61 has a hollow inside and accommodates the arc-shaped ring blocks 62. The rubber ring 61 is elastic and flexible, and has an inner periphery that allows the pin end 42 and the base 51 to pass through and that can return to its former shape so as to be sleeved around the annular groove 44 again. The plurality of arc-shaped ring blocks 62 can form a complete ring structure which can be locked in the annular groove 44. The plurality of arc-shaped ring blocks 62 can also be separated from each other such that the pin end 42 and the base 51 can pass through, and can be finally locked in the annular groove 44 under the action of the elastic force of the rubber ring 61.

Particularly, during processing, the arc-shaped ring blocks 62 may be coated with rubber so as to obtain the locking member 6.

Particularly, the locking member 6 may also be a plurality of balls.

Further, the pin end 42 includes an insertion rod 43, the annular groove 44 and a guide head 45. The insertion rod 43 is fixed to an upper end of the thread end 41. The annular groove 44 is annularly provided on an outer peripheral wall of a top end of the insertion rod 43. The guide head 45 is fixed to an upper end of the annular groove 44. The guide head 45 has a truncated cone-shaped structure with a small upper end and a large lower end.

According to the above description, the pin end 42 includes the insertion rod 43, the annular groove 44 and the guide head 45. Because the guide head 45 has a truncated cone-shaped structure with a small upper end and a large lower end, slopes of the truncated cone can be utilized, so that while the pin end 42 is inserted into the lock cylinder 11 along the axial direction, the fixed support 5 and the floating sleeve 13 can be pulled along the radial direction through the push receiving slot 52, and thus, the floating sleeve 13, which could freely move along the radial direction of the lock cylinder 11, can be automatically aligned, which facilitates the subsequent insertion.

Particularly, the push receiving slot 52 of the base 51 is matched with the truncated cone-shaped structure of the guide head 45, so that the guide head 45 can better pull the fixed support 5.

Particularly, the position of the annular groove 44 on the pin end 42 in the height direction should be matched with the position of the chute 16 of the floating sleeve 13 in the lock cylinder 11. The annular groove 44 may be slightly higher than the chute 16, so as to prevent the too short insertion rod 43 from causing improper installation of the annular groove 44 or prevent the too long insertion rod 43 from making the properly installed locking member 6 be pushed away by the insertion rod 43, thus causing the failure.

Particularly, the bottom of the chute 16 and the upper part of the annular groove 44 may be curved so as to adapt to the outer periphery of the locking member 6, thereby improving the coating effect of the locking member 6 and preventing the locking member from coming out. Moreover, the curved surface can increase the stressed area and improve the stress of the locking member 6.

Further, the connection structure with automatic adjustable eccentricity further includes an eccentric sleeve 22. An outer periphery of the eccentric sleeve 22 is threadedly connected to an inner side of the open end of the pin cylinder 21. The thread end 41 of the pin head 4 is threadedly connected to an inner periphery of the eccentric sleeve 22. The thread end 41 of the pin head 4 and the pin cylinder 21 are eccentrically arranged.

According to the above description, the eccentric sleeve 22 is further arranged between the pin head 4 and the pin cylinder 21. The eccentric sleeve 22 arranged mainly functions to make the pin end 42 of the pin head 4 not coaxial with the pin cylinder 21, so that after the eccentric sleeve 22 is adjusted, the eccentric pin end 42 can be at different positions in the supporting sleeve 12, which is more convenient for deviation correction.

Particularly, the bottom of the eccentric sleeve 22 is closed, which prevents the pin head 4 from falling out of the bottom of the eccentric sleeve 22.

Particularly, the lower end of the supporting sleeve 12 and the upper end of the eccentric sleeve 22 are respectively provided with a clamping hole 17, so that the supporting sleeve 12 or the eccentric sleeve 22 can be adjusted conveniently.

Further, the connection structure with automatic adjustable eccentricity further includes an elastic member 14. The elastic member 14 is sleeved on an outer periphery of the supporting tube 57. An upper end of the elastic member 14 is attached below an inner end surface of the lock cylinder 11, and a lower end of the elastic member 14 is attached to an upper end of the pressing ring 56. The elastic member 14 mainly functions as a support and provides elastic force so as to ensure the pressing frame 55 to press against the locking member 6.

Further, the connection structure with automatic adjustable eccentricity further includes a gasket 15. The gasket 15 is fixed below the inner end surface of the lock cylinder 11. The upper end of the elastic member 14 is attached to a lower end of the gasket 15. The gasket 15 is mainly used for providing a complete and smooth plane, which prevents the improper fit between the connecting member 7 and the inner end surface of the lock cylinder 11 from making the upper end of the supporting tube 57 or the upper end of the elastic member 14 unable to move, making the locking member 6 unable to be normally fitted with the pin head 4 and thus causing the failure.

Further, the adjusting portion 3 includes an adjusting nut 31 and a pin key 33. A middle part of the adjusting nut 31 is provided with a vertical and hollow through hole for the pin head 4 to pass through. An inner side of the adjusting nut 31 is provided with a vertical keyway 32 communicating with the through hole. One side of the pin key 33 is clamped and fixed in the keyway 32. An outer peripheral wall of the pin end 42 is provided with a vertical slide way 46 along an axial direction. An upper end of the slide way 46 communicates with the annular groove 44. The through hole of the adjusting nut 31 is sleeved outside the pin end 42. The other side of the pin key 33 is slidable in the slide way 46.

According to the above description, the adjusting portion 3 includes the adjusting nut 31 and the pin key 33. The through hole in the middle part of the adjusting nut 31 is provided with the keyway 32, and one side of the pin key 33 is clamped and fixed in the keyway 32. The outer peripheral wall of the pin end 42 is provided with the slide way 46, and the other side of the pin key 33 is slidable in the slide way 46. In this way, when the adjusting nut 31 is rotated, the pin head 4 can be driven to rotate through the fit between the pin key 33 and the slide way 46, and then, the pin head 4 can be driven to move forward or backward through the thread fit between the thread end 41 and the pin cylinder 21 so as to move into or out of the lock cylinder 11.

Particularly, the slide way 46 is provided in the insertion rod 43 of the pin end 42.

Further, the elastic member 14 is a flexible rubber tube.

Particularly, the elastic member 14 may also be a spring.

Figure 6:
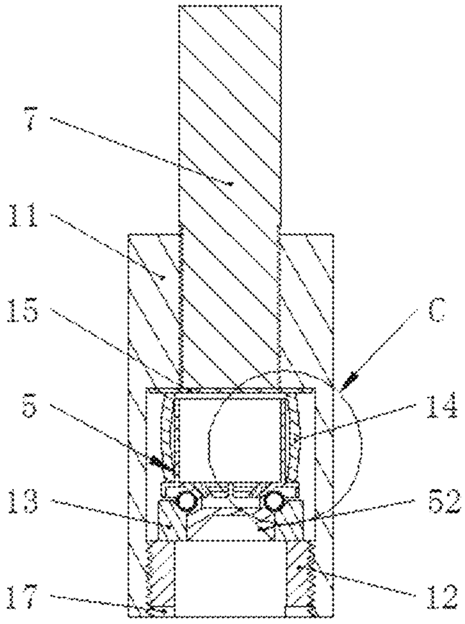
FIG. 6 is a schematic internal structural view of the locking portion before insertion.
Figure 7:
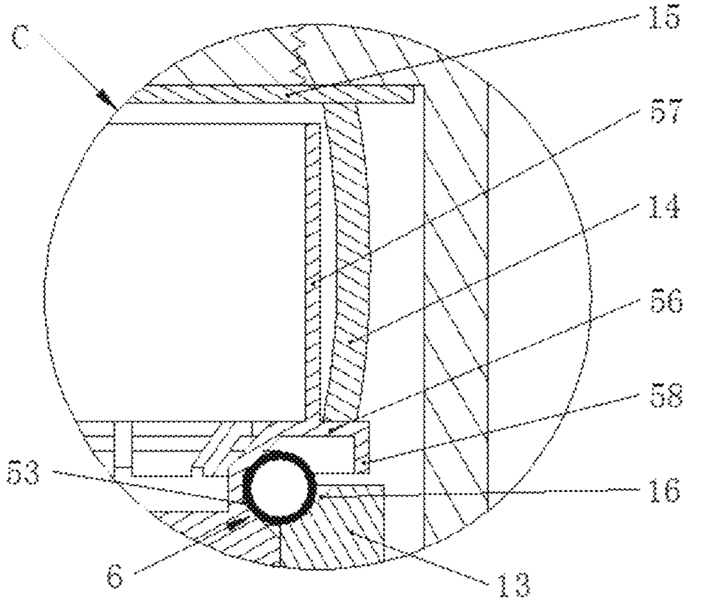
FIG. 7 is a partial enlarged view of C in FIG. 6.
Figure 8:
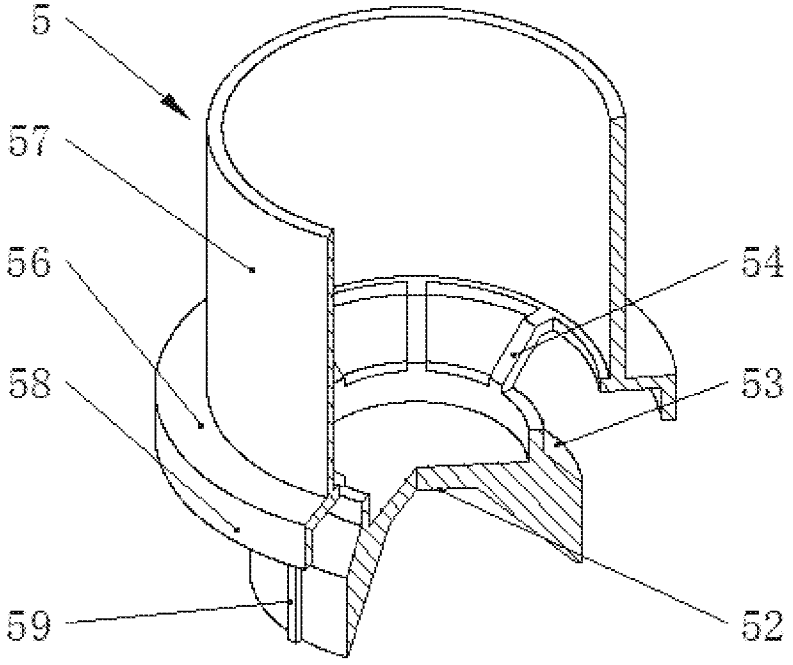
FIG. 8 is a partial cutaway view of a fixed support.
Figure 9:
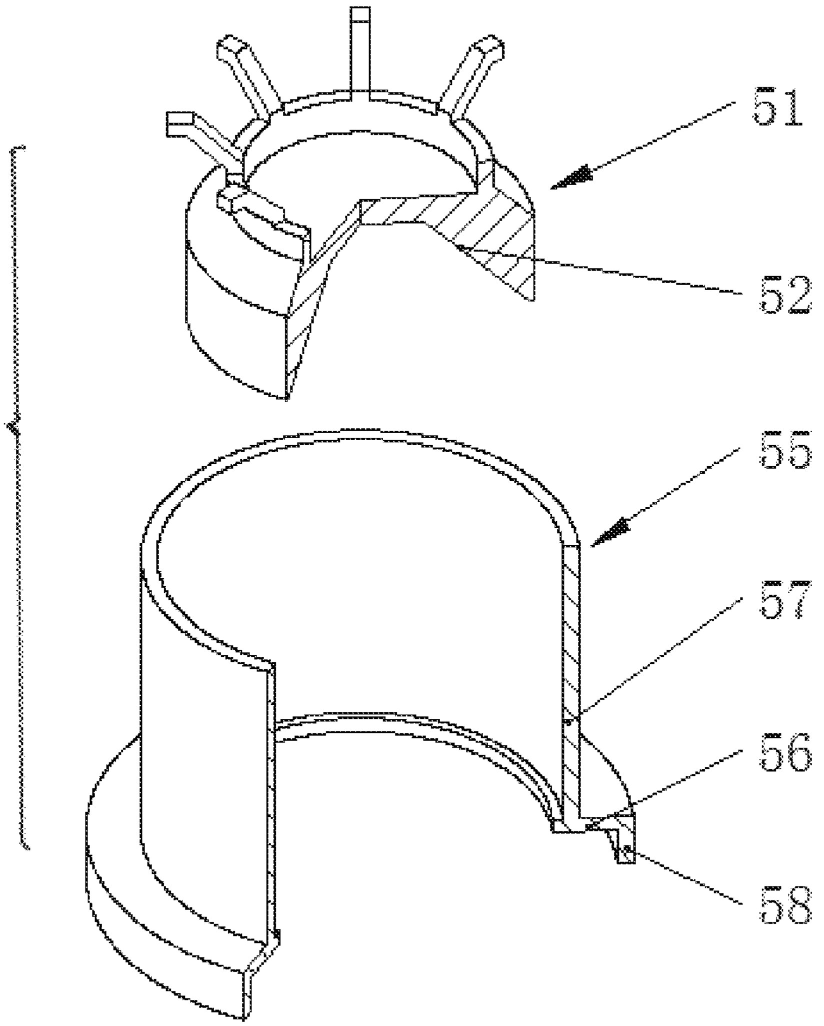
FIG. 9 is a schematic structural view of the fixed support after separated into a base and a pressing frame.
Figure 10:
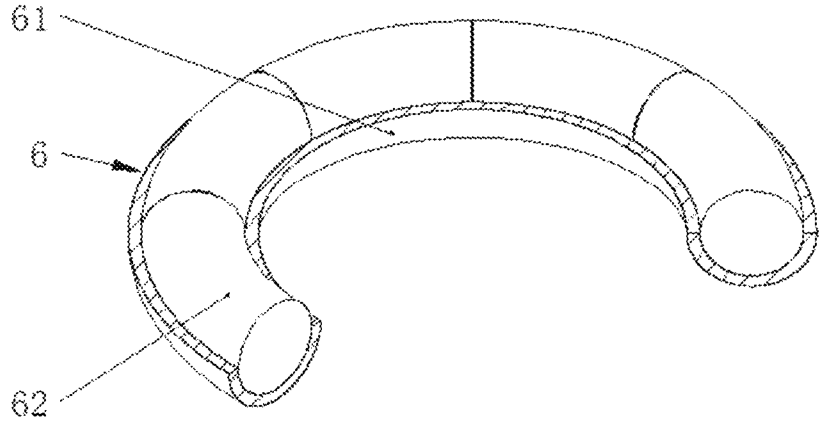
FIG. 10 is a schematic structural view of a locking member.

Working Principle of the Present Utility Model:

FIG. 6 to FIG. 7 are schematic views when the locking portion 1 is in an initial state. At this time, the fixed support 5 is installed on the inner periphery of the floating sleeve 13. The locking member 6 is installed on the annular groove 53. The floating sleeve 13 is movable along the radial direction of the lock cylinder 11. There is a gap between the upper end of the supporting tube 57 and the gasket 15. The elastic member 14 is under pressure.

Figure 11:
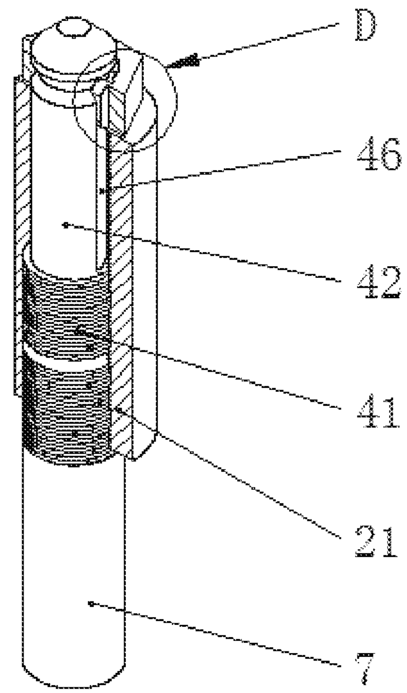
FIG. 11 is a schematic internal structural view of a pin portion before insertion.
Figure 12:
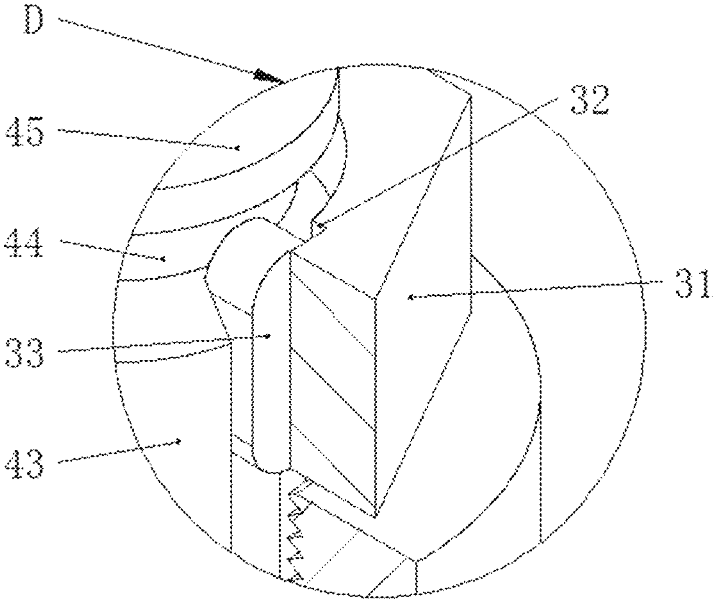
FIG. 12 is a partial enlarged view of D in FIG. 11.

FIG. 11 is a schematic view of the pin portion 2 in an initial state. At this time, the guide head 45 and part of the annular groove 44 are higher than the upper end of the adjusting nut 31.

Before use, one component is first lifted above the other component, and the relative positions of the two components are adjusted so that the pin portion 2 and the locking portion 1 that are fitted with each other on the components can be basically aligned. Then, the insertion is started.

Figure 17:
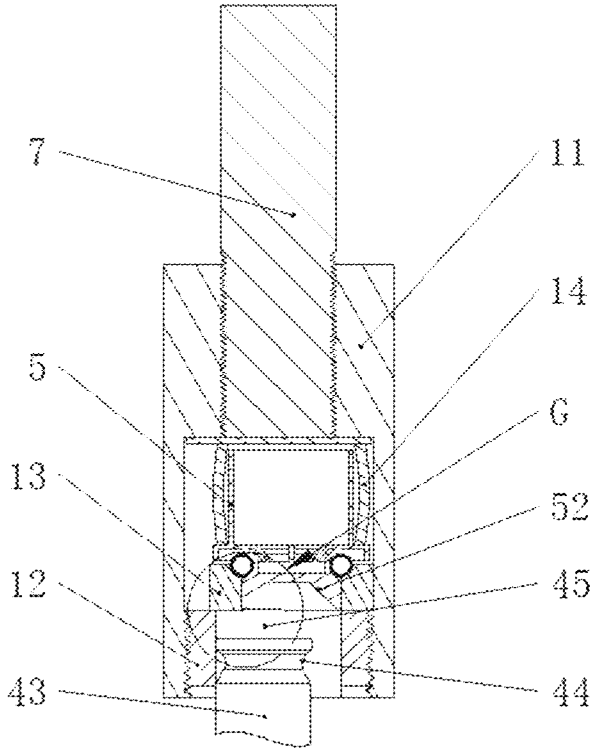
FIG. 17 is a schematic view showing a deviation correction principle of the present utility model.
Figure 18:
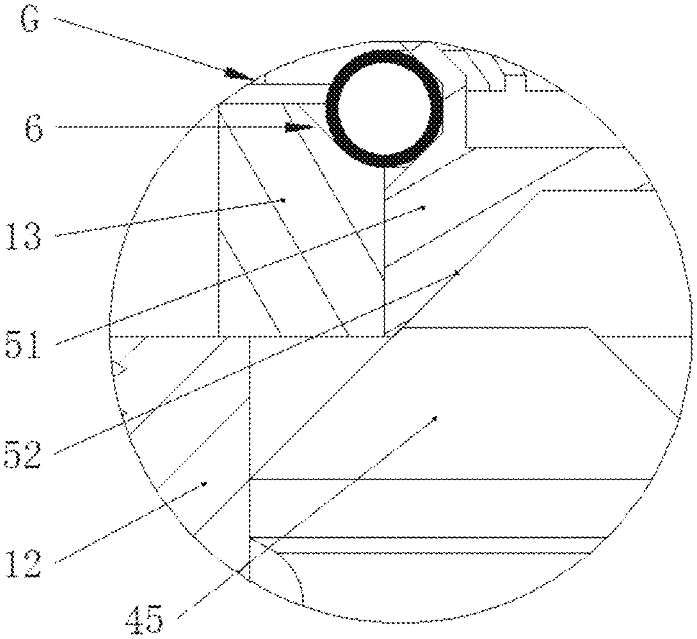
FIG. 18 is a partial enlarged view of G in FIG. 17.

Referring to FIG. 17 to FIG. 18, in the first stage—deviation correction stage, the adjusting nut 31 is rotated, so that the pin head 4 is inserted into the lock cylinder 11. The pin end 42 enters the supporting sleeve 12, the upper part of the guide head 45 comes into contact with the push receiving slot 52 of the fixed support 5, and the floating sleeve 13 and the latch mechanism are pushed under the guide action of the truncated cone of the guide head 45, so that the floating sleeve 13 and the latch mechanism can finally be coaxial with the pin head 4.

Particularly, in the most extreme state where the pin end 42 is attached to the inner periphery of the supporting sleeve 12 toward one side and the floating sleeve 13 and the latch mechanism are attached to the inner periphery of the lock cylinder 11 toward the other side, the outer side of the upper part of the guide head 45 can still be located within the range of the inner side of the lower part of the push receiving slot 52, so that the guide head 45 can still realize the function of correcting deviation.

Figure 13:
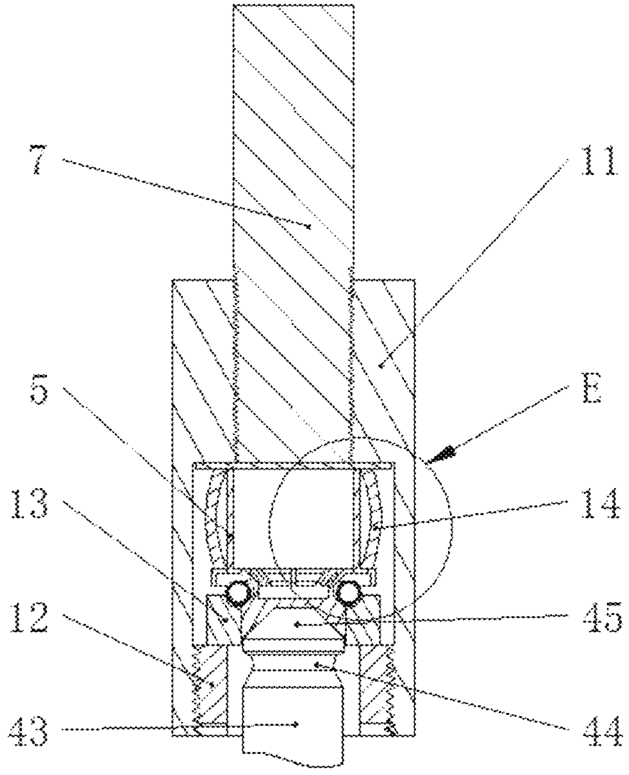
FIG. 13 is a schematic structural view when the base and the pressing frame are about to be separated after the pin head lifts the fixed support.
Figure 14:
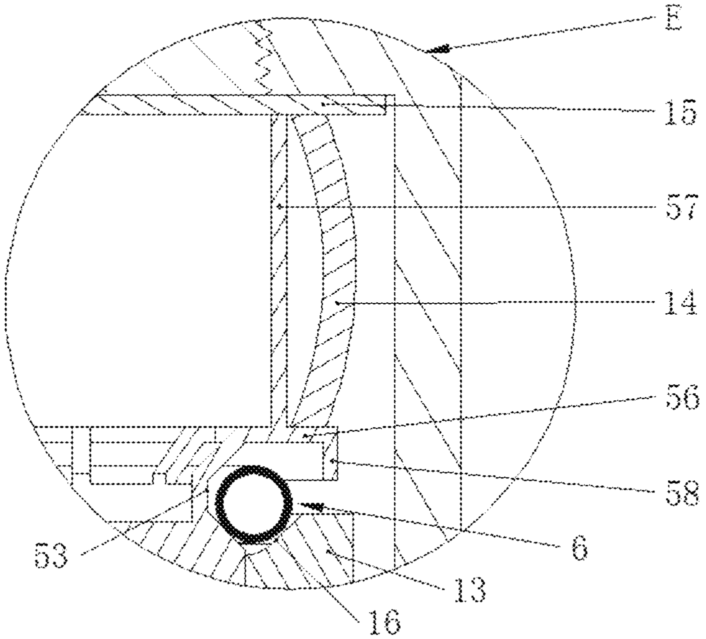
FIG. 14 is a partial enlarged view of E in FIG. 13.

Referring to FIG. 13 to FIG. 14, in the second stage—push stage, as the pin end 42 continuously moves forward, the top end of the guide head 45 abuts against the end surface of the push receiving slot 52. The pin end 42 continues moving forward, so that the fixed support 5 is pushed up until the top end of the supporting tube 57 contacts the gasket 15 and the supporting tube 57 is squeezed. At the same time, the elastic member 14 is continuously under pressure. Once the pin end 42 has moved further forward, the ribs 54 are forced to break, and the fixed support 5 is separated into the base 51 and the pressing frame 55.

Figure 15:
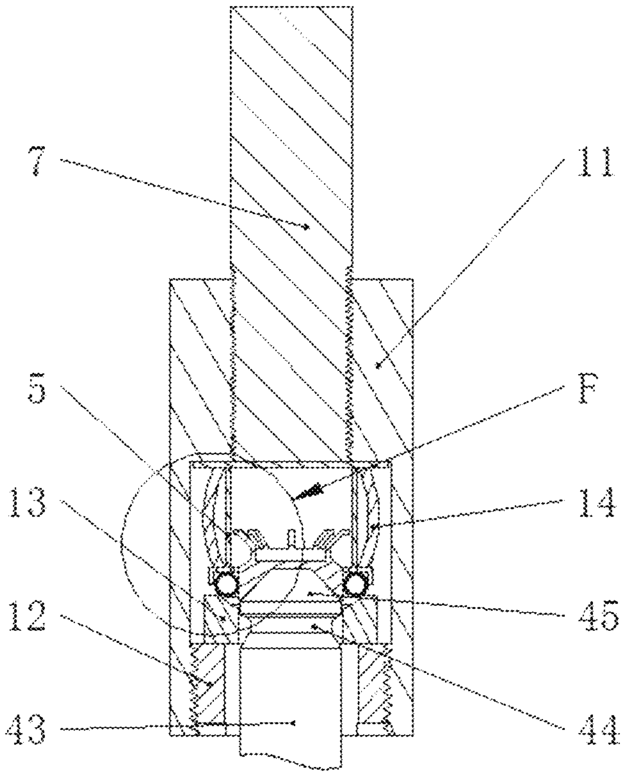
FIG. 15 is a schematic structural view when the base moves upward to push away the locking member after the base and the pressing frame are separated.
Figure 16:
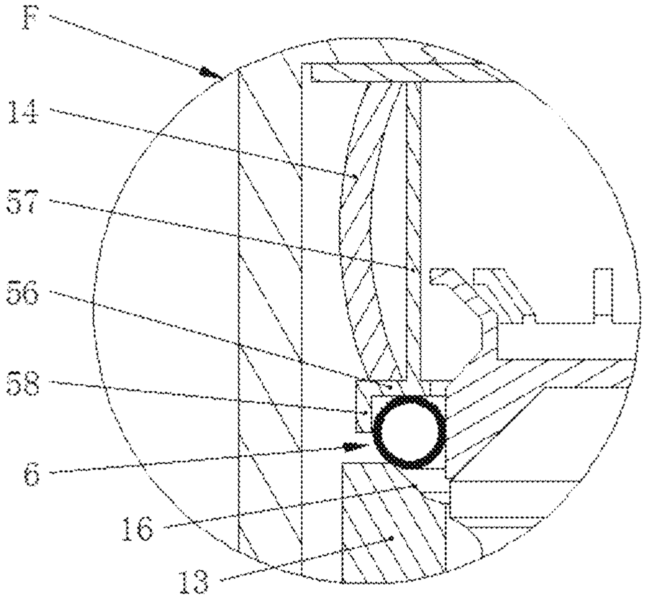
FIG. 16 is a partial enlarged view of F in FIG. 15.

Referring to FIG. 15 to FIG. 16, in the third stage—transition stage, after the base 51 is separated from the pressing frame 55, as the pin end 42 further moves forward, since the outer diameter of the lower part of the annular groove 53 gradually increases, the locking member 6 expands along with the lower part of the annular groove 53 so as to finally surround the outer side of the base 51. At the same time, the expanding locking member 6 moves upward along the chute 16 of the floating sleeve 13. At this time, the locking member 6 is in the maximum expansion state and the maximum height stroke state. At the same time, since the locking member 6 expands and moves upward, the pressing frame 55 is lifted by the locking member 6, and the supporting tube 57 and the elastic member 14 are under maximum pressure. In addition, the outer periphery of the locking member 6 also squeezes the inner periphery of the retaining ring 58.

Referring to FIG. 1 to FIG. 5, in the fourth stage—locking stage, the pin end 42 continues moving forward until the base 51 passes through the pressing ring 56 and the locking member 6 is separated from the outer periphery of the base 51. As the pin end 42 continuously moves forward, the locking member 6 moves from the outer side of the guide head 45 to the outer side of the annular groove 44. The retaining ring 58 under pressure releases elastic force so as to press the locking member inward 6. Since the outer diameter of the annular groove 44 is smaller than the outer diameter of the guide head 45, under the action of the elastic force of the rubber ring 61, the locking member 6 returns to its former shape so as to be sleeved on the annular groove 44. Moreover, the supporting tube 57 and the elastic member 14 under pressure release elastic force so as to press the pressing frame 55 downward, so that the locking member 6 is pushed by the pressing ring 56 to move downward along the chute 16 of the floating sleeve 13 and the locking member 6 is pressed against the annular groove 44, thereby realizing locking.

After the insertion of all the connection structures on the two component is completed, the connection structures are adjusted one by one. The adjusting nut 31 is rotated so that the pin head 4 is moved to its maximum forward state. Since the annular groove 44 is only slightly higher than the chute 16, after the pin head 4 is moved to its maximum forward state, the locking member 6 is only slightly pushed away by the insertion rod 43 and is still in the chute 16 of the floating sleeve 13, so that the connection structure will not fail. Moreover, the locking member 6 is in the annular groove 44, thereby ensuring the locking effect. Then, the adjusting nut 31 is rotated in the opposite direction so as to move the pin head 4 backward, thereby completing the locking. Since the included angle α between the chute 16 and the upper end of the annular groove 44 is smaller than 180°, after the pin head 4 moves backward, the locking member 6 can still stay in the annular groove 44 and will not further expand outward due to the included angle α, thereby effectively preventing the locking member 6 from coming out.

After the insertion of all the connection structures on the two components is completed, a sealing material such as cement or glue is spread in the gap between the lock cylinder 11 and the pin cylinder 21 so as to fill in the gap in the connection structure, which increases the connection strength of the connection structure and prevents looseness or corrosion of the connection structure, causing the failure of the connection structure.

Figure 19:
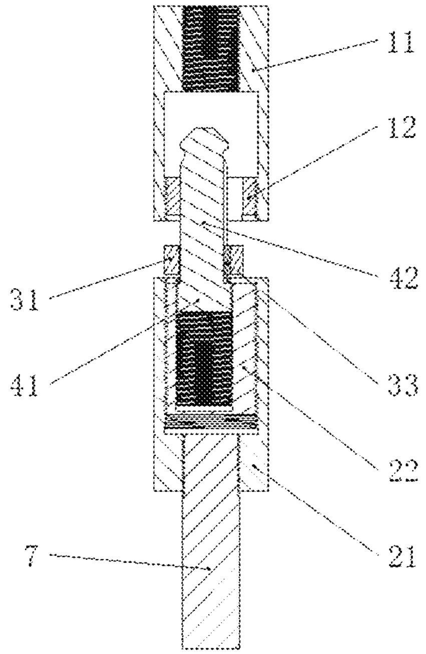
FIG. 19 is a cutaway view when the pin portion adopts an eccentric sleeve.
Figure 20:
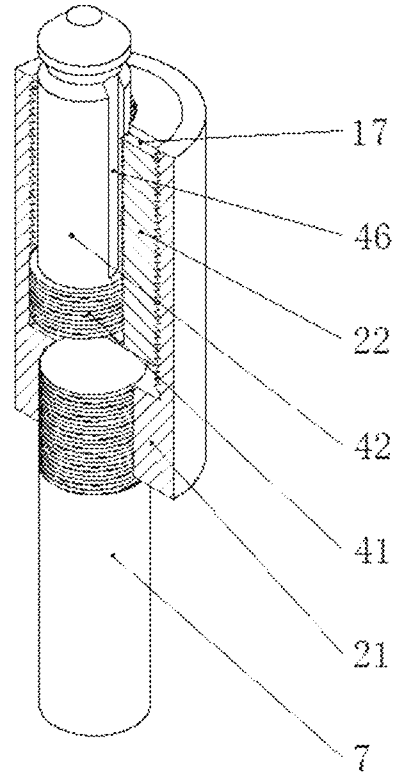
FIG. 20 is a schematic internal structural view when the pin portion adopts the eccentric sleeve.

Referring to FIG. 19 to FIG. 20, when the eccentric sleeve 22 is used, the eccentric pin end 42 can be at different positions in the supporting sleeve 12, which is more convenient for deviation correction and subsequent component adjustment.

The above only describes the embodiments of the present utility model, and is not intended to limit the scope of the present utility model. Any equivalent structure or equivalent process transformation made by using the contents of the specification and accompanying drawings of the present utility model or directly or indirectly applied in other related technical fields are similarly included in the scope of protection of the present utility model.

What is claimed is:

1. A connection structure with automatic adjustable eccentricity, characterized by a locking portion (1) and a pin portion (2); wherein an adjusting portion (3) is arranged between the locking portion (1) and the pin portion (2); the locking portion (1) comprises a lock cylinder (11) open toward the pin portion (2), a supporting sleeve (12) threadedly arranged at an open end of the lock cylinder (11), a floating sleeve (13) movably arranged on the supporting sleeve (12), and a latch mechanism arranged on the floating sleeve (13); the floating sleeve (13) is movable along a radial direction of the lock cylinder (11); the pin portion (2) comprises a pin cylinder (21) and a pin head (4); the pin cylinder (21) is open toward the locking portion (1); the pin head (4) comprises a thread end (41) threadedly connected with an open end of the pin cylinder (21) and a pin end (42) fixed on the thread end (41); an outer periphery of an upper part of the pin end (42) is provided with an annular groove (44); once the pin end (42) is extended upwardly out of the supporting sleeve (12) and the floating sleeve (13), the annular groove (44) is fitted and fixed with the latch mechanism; the adjusting portion (3) is sleeved on the pin end (42) and is arranged to control a depth of the pin head (4) inserted into the lock cylinder (11); and the other end of the lock cylinder (11) and the other end of the pin cylinder (21) are respectively provided with a connecting member (7).

2. The connection structure with automatic adjustable eccentricity according to claim 1, characterized in that the latch mechanism comprises a pressing frame (55) and a locking member (6); an inner periphery of the locking member (6) is sleeved on an outer periphery of the annular groove (44), and a lower part of the locking member (6) is accommodated in an upper part of an inner periphery of the floating sleeve (13); the pressing frame (55) comprises a pressing ring (56), a supporting tube (57) and a retaining ring (58); the pressing ring (56) is arranged horizontally and sleeved above an outer side of the annular groove (44); the pressing ring (56) presses against the locking member (6); the supporting tube (57) is vertical and hollow and is fixed to an upper end of an inner side of the pressing ring (56), and the supporting tube (57) is located on an outer periphery of the pin end (42); the retaining ring (58) is vertical and hollow and is fixed to a lower end of an outer side of the pressing ring (56), and the retaining ring (58) is located on an outer side of the locking member (6); and the retaining ring (58) is located above the floating sleeve (13).

3. The connection structure with automatic adjustable eccentricity according to claim 2, characterized in that the locking member (6) comprises a rubber ring (61) and a plurality of arc-shaped ring blocks (62); an inner periphery of the rubber ring (61) is sleeved on the outer periphery of the annular groove (44), and a lower part of the rubber ring (61) is accommodated in the upper part of the inner periphery of the floating sleeve (13); the rubber ring (61) has a hollow ring structure; the plurality of arc-shaped ring blocks (62) are arranged to form a complete ring structure; and the ring structure formed by the arc-shaped ring blocks (62) is accommodated inside the ring structure of the rubber ring (61).

4. The connection structure with automatic adjustable eccentricity according to claim 2, characterized by further comprising an elastic member (14); wherein the elastic member (14) is sleeved on an outer periphery of the supporting tube (57); and an upper end of the elastic member (14) is attached below an inner end surface of the lock cylinder (11), and a lower end of the elastic member (14) is attached to an upper end of the pressing ring (56).

5. The connection structure with automatic adjustable eccentricity according to claim 4, characterized by further comprising a gasket (15); wherein the gasket (15) is fixed below the inner end surface of the lock cylinder (11); and the upper end of the elastic member (14) is attached to a lower end of the gasket (15).

6. The connection structure with automatic adjustable eccentricity according to claim 4, characterized in that the elastic member (14) is a flexible rubber tube.

7. The connection structure with automatic adjustable eccentricity according to claim 1, characterized in that the pin end (42) comprises an insertion rod (43), the annular groove (44) and a guide head (45); the insertion rod (43) is fixed to an upper end of the thread end (41); the annular groove (44) is annularly provided on an outer peripheral wall of a top end of the insertion rod (43); the guide head (45) is fixed to an upper end of the annular groove (44); and the guide head (45) has a truncated cone-shaped structure with a small upper end and a large lower end.

8. The connection structure with automatic adjustable eccentricity according to claim 1, characterized by further comprising an eccentric sleeve (22); wherein an outer periphery of the eccentric sleeve (22) is threadedly connected to an inner side of the open end of the pin cylinder (21); the thread end (41) of the pin head (4) is threadedly connected to an inner periphery of the eccentric sleeve (22); and the thread end (41) of the pin head (4) and the pin cylinder (21) are eccentrically arranged.

9. The connection structure with automatic adjustable eccentricity according to claim 1, characterized in that the adjusting portion (3) comprises an adjusting nut (31) and a pin key (33); a middle part of the adjusting nut (31) is provided with a vertical and hollow through hole for the pin head (4) to pass through; an inner side of the adjusting nut (31) is provided with a vertical keyway (32) communicating with the through hole; one side of the pin key (33) is clamped and fixed in the keyway (32); an outer peripheral wall of the pin end (42) is provided with a vertical slide way (46) along an axial direction; an upper end of the slide way (46) communicates with the annular groove (44); the through hole of the adjusting nut (31) is sleeved outside the pin end (42); and the other side of the pin key (33) is slidable in the slide way (46).

* * * * *